Patented Jan. 23, 1934

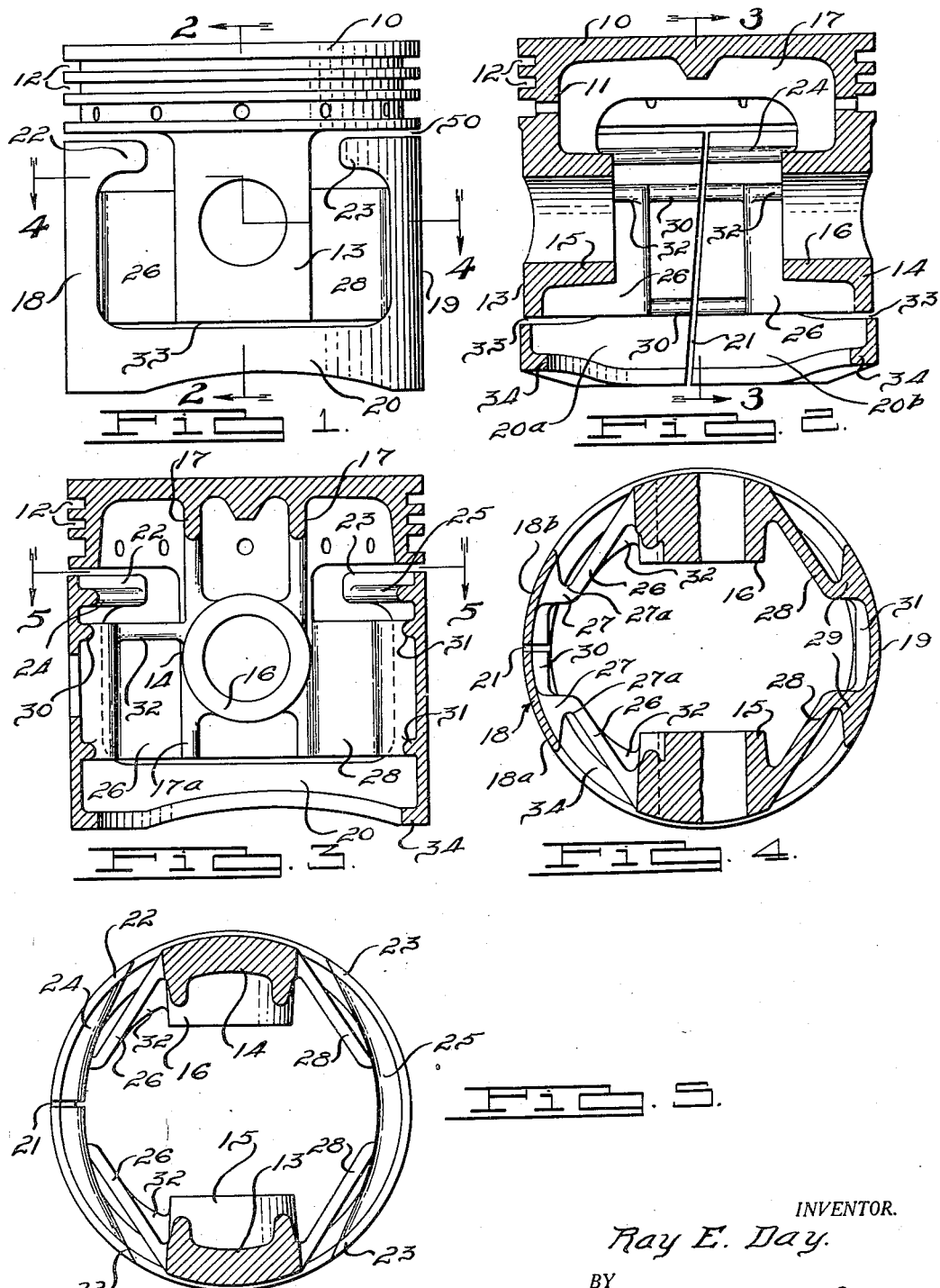

1,944,223

UNITED STATES PATENT OFFICE 1,944,223

PISTON

Ray E. Day, Detroit, Mich.

Application July 8, 1933. Serial No. 679,513

10 Claims. (Cl. 309—11)

This invention relates to pistons for internal combustion engines and particularly, although not exclusively, to pistons cast from metal such as aluminum alloy having a relatively high coefficient of expansion.

An object of the invention is to provide a piston which may be fitted relatively closely in the cylinder and wherein improved means is provided for controlling the expansion of the skirt whereby material improvement in operation at high engine speeds, reduction in friction, greater uniformity in pressures on the bearing surfaces, and substantial elimination of scoring and undue wear will be secured.

A further object of the invention is to provide a piston wherein skirt expansion is controlled by mechanically transmitting from the bosses to one side of the skirt a contracting force and to the opposite side an expanding force, and at the same time by transmitting to the latter side from the contractible side an opposing or counteracting force.

Other objects of this invention will appear in the following description and appended claims, reference being had to the accompanying drawing forming a part of this specification wherein like reference characters designate corresponding parts in the several views.

Fig. 1 is a side elevation illustrating a piston embodying the invention.

Fig. 2 is a vertical section taken through lines 2—2 of Fig. 1 in the direction of the arrows.

Fig. 3 is a vertical section taken through lines 3—3 of Fig. 2 in the direction of the arrows.

Fig. 4 is a horizontal section taken substantially through lines 4—4 of Fig. 1 in the direction of the arrows.

Fig. 5 is a horizontal section taken through lines 5—5 of Fig. 3 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In its preferred form, herein illustrated by way of example, the present piston is provided with a head 10 including a depending annular side portion 11 provided with suitable ring grooves 12. The head of the piston is provided at diametrically opposed sides with depending integral extensions 13 and 14 into which are cast the wrist pin bosses 15 and 16 which are drilled to provide the usual wrist pin openings, as illustrated. The head 10 and bosses 15 and 16 are also joined interiorly of the piston for the purpose of stiffening and reinforcing the structure by means of continuous spaced ribs 17 which extend across the inner face of the head and downwardly at opposite sides of the bosses, these ribs preferably extending below the pin bearings as shown at 17a and terminating at the lower edge of the extensions 13 and 14.

The piston is provided below the head 10 with a skirt which comprises opposite bearing portions 18 and 19. The upper edges of these bearing faces are separated from the head by means of horizontal slots 50 and the lower ends of the bearing portions 18 and 19 are continuously joined circumferentially through bearing portions 20 extending around opposite sides of the piston below the boss carrying extensions 13 and 14. The skirt, therefore, includes at its lower end a ring-like bearing 20 terminating at the side 18 in portions 20a and 20b separated by means of a vertical slot 21, this slot extending vertically to the horizontal slot 50 through the center of the bearing portion 18 so as to provide at one side of the piston separated bearing faces 18a and 18b.

It will be noted that the bearing portions 18 and 19 are of minimum width centrally thereof in the regions opposite the bosses. The upper side edges of the split bearing portions 18a and 18b are extended laterally toward the bosses to provide over-hanging bearing wings or projections 22, and in like manner the bearing portion 19 is provided at its opposite upper edges with similar over-hanging bearing wings or projections 23. The bearing wings or extensions 22 are reinforced and stiffened by means of arcuate ribs 24 which are separated at their inner ends by the gap 21. The bearing extensions 23 at the opposite side of the piston are integrally joined by a single continuous rib 25 which stiffens and reinforces the upper edge of the skirt portion 19.

The split skirt sections 18a and 18b are supported from the bosses by means of struts 26 which integrally join the parts and extend in diverging relation from the sections 18a and 18b to the bosses. It will be noted that the struts 26 terminate, at their outer ends, at points nearly opposite the outer edges of the skirt portions 18a and 18b, and are united to the edges of these skirt portions by means of bosses 27, these bosses being preferably relieved at 27a so that the extreme edges of the skirt portions will slightly over-hang the struts. The bearing portion 19 at the opposite side of the piston is integrally united to the bosses by means of diverging struts 28 which are connected to the outer edges of the bearing portion 19 by means of bosses 29.

For the purpose of stiffening the separated skirt portions 18a and 18b and maintaining the same against distortion, vertically spaced horizontal reinforcing ribs 30 (see Fig. 2) are cast into these skirt portions, these ribs being separated at the gap 21. The skirt section 19 is also stiffened, so as to resist distortion, by means of horizontal ribs 31 which extend between and unite the bosses 29.

In the present preferred form of the invention, the struts 28 extend from the outer edges of the bosses substantially to the outer edges of the skirt section 19, and these struts extend at an included angle of approximately 115°. By arranging the struts at a relatively flat angle a more positive and pronounced inward pull of the skirt 19 is possible when the bosses move outwardly. Moreover, due to the bearing wings 23 at this side of the piston, as well as the bearing wings 22, side rock of the piston resulting from the angular movement of the connecting rod will be avoided since these wings assist in guiding and holding the piston against angular oscillation within the cylinder.

The struts 26 at the split side of the piston also extend at an included angle of approximately 115°. These struts, however, are preferably stiffened as compared with struts 28, such as by means of reinforcing ribs or webs 32. In the present instance, therefore, the struts 26 will be materially stiffer than the struts 28 at the opposite side.

As previously stated, the main bearing portions 18 and 19 are continuously joined around the lower edge of the skirt by the annular or circular truss forming bearing 20, this bearing being separated from the boss extensions 13 and 14 by horizontal slots 33. The lower edge of the skirt is preferably provided with a continuous circular flange 34 which extends continuously around the bottom of the skirt and terminates at the slot 21, thus reinforcing the lower edge and providing a reinforced circumferential truss effective to transmit actuating forces from the bearing side 19 to the bearing portions 18a and 18b.

The slotted side 18 of the piston is preferably stiff enough to withstand and resist any cylinder wall pressure tending to collapse it, the inward closing of bearing portions 18a and 18b being mechanically accomplished through the strut action. Hence, this side of the piston may be materially stiffened through the ribbing 24, 30 and 32, and the struts 26, since it is unnecessary to form this side of the piston with sufficient flexibility, as heretofore, to collapse inwardly under cylinder wall pressure, this for the reason that the control of the piston diameter is secured through mechanical action.

In operation it will be seen that the strut arrangement between the bosses and skirt, and the preferred truss arrangement at the lower edge of the skirt, will result in the consolidation of substantially opposing forces at one bearing side of the piston, i. e. the slotted side. It will be understood that during operating conditions the head 10 of the piston will become materially hotter than the skirt, tending to expand the head at a greater rate than the tendency of the skirt to expand. The bosses, being integral with the head, will tend to move outwardly in accordance with the head expansion. This outward movement of the bosses in opposite directions mechanically draws the bearing face 19 inwardly through the toggle action of diverging struts 28. At the opposite side of the piston, however, substantially a different action occurs. The outward movement of the bosses is here transmitted to the diverging struts 26 which, being disconnected at their outer ends, can exert no toggle action. These struts would, if acting independently of any other force, tend to pull the bearing portions 18a and 18b apart and widen the gap at slot 21. However, this action at bearing side 18 is in part counteracted by an opposing force transmitted from the opposite side of the skirt.

It will be noted that the flanged bearing 20 extends continuously around the lower edge of the piston to the slot 21, thus forming a circular truss. Hence, any inward movement of bearing 19, due to the strut action will be transmitted through truss 34 circumferentially around the piston to bearing portions 18a and 18b. Since the latter bearing portions are reinforced by ribs 24 and 30, and hence maintained at substantially constant curvilinear contour against distortion, and since these bearing portions are separately anchored to the bosses by struts 32, the arrangement may be designed, depending upon particular engine requirements, to maintain the skirt against increase of its diameter normal to the axis of the bosses. This is accomplished as a result of mechanical forces exerted by the bosses upon outward movement thereof. With the bearing side 19 preferably located at the high thrust side of the piston, it will be seen that the forces consolidated on the low thrust side 18 due to the strut and truss arrangement may be calculated so that the resultant of these opposing forces will in effect be a single compound force which can be utilized to decrease the skirt diameter on its axis normal to the axes of the bosses and thus close the gap 21. Hence, the skirt may be fitted close in the cylinder when cold and will substantially maintain this fit when hot under operating conditons. The relative angularity of the struts and the degrees of reinforcement of the parts are preferably calculated so that the piston skirt in operation will be maintained at substantially constant diameter. Actually, in preferred practice, the skirt will be mechanically contracted in diameter a slight amount equivalent to the slight amount it would normally increase in diameter during operation.

It will be noted that the struts of each pair 26 and 28 are arranged so as to diverge from the outer edges of the bearing sides toward the outer ends of the bosses at an included angle preferably greater than 100°. It will be understood that the degree of closure of the gap 21 may be regulated by varying the angularity or stiffness of the struts 28 and the stiffness of struts 26 so as to accommodate different engines or different operating conditions. Since the struts 26 are preferably stiffened by means of the reinforcing webs 32, and since the slotted bearing side 18 is additionally stiffened by ribs 34 and 30, and by truss 20, 34, the slotted side may thus be stiff enough to be substantially unaffected by cylinder wall pressure. Thus, contraction of skirt diameter due to heat expansion, may be accomplished mechanically rather than by permitting the piston to expand against the cylinder and then utilizing the resulting wall pressure to collapse the skirt. The important new result secured by the present invention by this novel mode of operation lies in the elimination of excessive skirt pressure against the cylinder wall, reduction of "high spots" where undue pressure occurs, and elimination of scoring.

I claim:

1. A piston comprising a head, wrist pin bosses, a skirt separated from the head and vertically split at one thrust bearing side, inwardly diverging struts extending from each thrust bearing side to the bosses, the struts at the split side being stiffer than the struts at the opposite side, and a truss forming ring joining said thrust bearing sides and effective to transmit a contracting force to the split bearing side from the opposite side as a result of mechanical forces exerted by the bosses upon outward movement thereof.

2. A piston comprising a head, bosses joined to the head, a skirt comprising oppositely disposed thrust bearing members separated from the head by a horizontal slot and also separated from the bosses, one of said bearing members at one side of the piston being vertically split to provide separated bearing portions and the other bearing member being solid, diverging struts joining the solid bearing member with the bosses and effective to impart thereto a radial force tending to move said solid bearing member inwardly upon thermal expansion of the head, struts forming said separated bearing portions with the bosses, and a truss forming ring integrally joining the lower ends of said bearing members for transmitting said force from the solid bearing member to said separated bearing portions so as to resist expansion of the skirt on a diameter normal to the axis of the bosses.

3. A piston comprising a head having integral depending extensions, wrist pin bosses carried by said extensions, a skirt separated from the head and from said extensions and comprising a solid bearing portion at one side and a vertically split bearing portion at the opposite side, a pair of struts extending in diverging relation from each bearing portion to the bosses, the struts at the solid bearing side being effective to exert by toggle action a contracting force on the solid bearing portion upon outward movement of the bosses due to thermal expansion of the head, and a truss forming bearing ring separated from said extensions and integrally joining said bearing portions below the bosses for transmitting said force circumferentially to the split bearing portion in such manner as to resist expansion of the skirt on its diameter normal to the axis of the bosses as a result of said outward movement of the bosses.

4. A piston comprising a head having integral depending extensions, wrist pin bosses carried by said extensions, a skirt separated from the head and said extensions and comprising a solid bearing portion at one side and a vertically split bearing portion at the opposite side, a pair of struts extending from each bearing portion to the bosses, the struts at the solid bearing side being angularly arranged to exert by toggle action a contracting force on the solid bearing portion upon outward movement of the bosses due to thermal expansion of the head, and a reinforced truss forming bearing ring separated from said extensions and integrally joining said bearing portions below the bosses for transmitting said force circumferentially to the split bearing portion in such manner as to resist expansion of the skirt on its diameter normal to the axis of the bosses as a result of said outward movement of the bosses.

5. A piston comprising a head, wrist pin bosses integral therewith, a skirt separated from the head and having a solid bearing portion at one thrust side and vertically separated bearing portions at the opposite thrust side, struts extending in diverging relation from the solid bearing portion to the bosses for exerting by toggle action a contracting force on said solid bearing portion upon outward movement of the bosses, a horizontally extending strut joining each separated bearing portion with a boss, and a ring-like truss circumferentially joining the lower ends of said solid and separated bearing portions, said truss being separated from the bosses and effective to transmit said force to the separated bearing portions thereby to resist expansion of the skirt on its diameter normal to the axis of the bosses due to outward movement of the latter.

6. A piston comprising a head having depending integral extensions, wrist pin bosses carried thereby, a skirt comprising a solid bearing portion at one thrust side and a pair of independent bearing portions at the opposite thrust side separated by a vertical slot, horizontal struts extending angularly from the bosses to said last named bearing portions and terminating adjacent the slot, all of said bearing portions being wholly separated from said boss carrying extensions, and means including a truss forming bearing ring integrally joining the lower ends of all of said bearing portions for transmitting from the solid bearing portion to said independent separated bearing portions a contracting force effective to maintain the skirt against increase of its diameter normal to the axis of the bosses as a result of mechanical forces exerted by the bosses upon outward movement thereof.

7. A piston comprising a head; a pair of integral extensions depending from said head; a pin boss carried by each of said extensions; and a skirt, said skirt having a truss-forming bearing ring at one end and a pair of opposed arcuate bearing portions extending upwardly therefrom forming opposed thrust faces of the piston, said truss-forming bearing ring being continuous intermediate said thrust faces, one of said thrust faces being provided with a vertical slot and the other of said thrust faces being circumferentially continuous, each of said thrust faces being connected to said extensions by a pair of inwardly diverging struts, said truss-forming bearing ring and thrust faces being otherwise disconnected from said extensions.

8. A piston comprising a head having integral depending extensions, wrist pin bosses carried by said extensions, a pair of opposed thrust bearing members separated at their top and side edges from said extensions, horizontal struts extending in diverging relation from the central portion of said bearing members to said extensions, the regions of juncture of said struts with said bearing members being a substantial distance below the upper edges of the bearing members and a substantial distance above the lower edges thereof, thereby providing upper circumferential bearing extensions at the upper ends of the bearing members free of direct lateral thrust from the bosses and relatively more yielding than said central portions of the thrust bearing members in the locality of said strut junctures; and a lower circumferential bearing ring extending below and being separated from the boss carrying extensions and having substantially the same diameter as said central thrust bearing portions, said upper bearing extensions at each thrust side of the piston being circumferentially spaced at their ends from the bosses and wholly disconnected from the bearing extensions at the opposite thrust side of the piston and being independently compressible to resist side rock of the piston, said upper bearing extensions also having substantially the same diameter as the central portion of said thrust bearing members.

9. A piston comprising a head having depending integral extensions, wrist pin bosses carried thereby, a skirt comprising a solid bearing portion at one thrust side and a pair of independent bearing portions at the opposite thrust side separated by a vertical slot, horizontal struts extending in diverging relation from said last named bearing portions to the bosses, all of said bearing portions being separated from said boss carrying extensions, and means including a lower circumferential bearing ring integrally joining the lower ends of all of said bearing portions for transmitting from the solid bearing portion to said independent separated bearing portions a contracting force effective to maintain the skirt against increase of its diameter normal to the axis of the bosses as a result of mechanical forces exerted by the bosses upon outward movement thereof.

10. A piston comprising a head; a pair of integral extensions depending from said head; a pin boss carried by each of said extensions; a skirt having a pair of opposed arcuate bearing portions forming opposed thrust faces of the piston; one of said thrust faces being provided with a vertical slot and the other of said thrust faces being circumferentially continuous, said slotted thrust face being connected to said extensions by a pair of inwardly extending struts, and means including a lower circumferential bearing ring integrally joining the lower ends of said bearing portions for transmitting from said continuous thrust face to said slotted thrust face forces tending to maintain the skirt against increase of its diameter normal to the axis of the bosses as a result of mechanical forces exerted by the bosses upon outward movement thereof, said bearing portions and ring being separated from said extensions.

RAY E. DAY.